United States Patent
Delaney

(10) Patent No.: US 7,885,291 B2
(45) Date of Patent: *Feb. 8, 2011

(54) MOBILE TEMPORARY INCIDENT AREA NETWORK FOR LOCAL COMMUNICATIONS INTEROPERABILITY

(75) Inventor: William J. Delaney, Bedford, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 199 days.

This patent is subject to a terminal disclaimer.

(21) Appl. No.: 12/319,276

(22) Filed: Jan. 5, 2009

(65) Prior Publication Data
US 2009/0116509 A1 May 7, 2009

Related U.S. Application Data

(63) Continuation of application No. 10/943,323, filed on Sep. 17, 2004, now Pat. No. 7,508,840.

(51) Int. Cl.
*H04J 3/22* (2006.01)
*H04L 12/28* (2006.01)
(52) U.S. Cl. .................................. 370/466; 370/401
(58) Field of Classification Search ......... 370/310–350, 370/401, 466, 467
See application file for complete search history.

(56) References Cited

U.S. PATENT DOCUMENTS

| 6,404,775 | B1* | 6/2002 | Leslie et al. ................ 370/466 |
| 7,034,678 | B2 | 4/2006 | Burkley et al. |
| 7,091,852 | B2 | 8/2006 | Mason et al. |
| 7,245,216 | B2* | 7/2007 | Burkley et al. ......... 340/539.13 |
| 7,508,840 | B2* | 3/2009 | Delaney ..................... 370/466 |
| 7,634,231 | B2* | 12/2009 | Hundal ..................... 455/63.1 |
| 7,792,981 | B2* | 9/2010 | Taylor ....................... 709/230 |
| 2001/0010689 | A1* | 8/2001 | Awater et al. .............. 370/344 |
| 2006/0092865 | A1* | 5/2006 | Williams ................... 370/310 |
| 2008/0101252 | A1* | 5/2008 | Bui ........................... 370/252 |

OTHER PUBLICATIONS

Scott F. Midkiff et al. "Rapidly-Deployable Broadband Wireless Networks for Disaster and Emergency Response". Presented at The First IEEE Workshop on Disaster Recovery Networks (DIREN '02) Jun. 24, 2002. New York City, NY.
Communications-Applied Technology. 2001.
ICRI—Incident Commanders Radio Interface. (Per Internet Archive: first appeared in Jan. 2002).

* cited by examiner

*Primary Examiner*—Warner Wong
(74) *Attorney, Agent, or Firm*—Robert K. Tendler; Daniel J. Long

(57) ABSTRACT

An ad hoc emergency interoperability communication network is established by providing universal temporary incident area network modules that communicate with each other on an open network, with the network being established when vehicles containing the temporary incident area network modules are within range of each other.

19 Claims, 11 Drawing Sheets

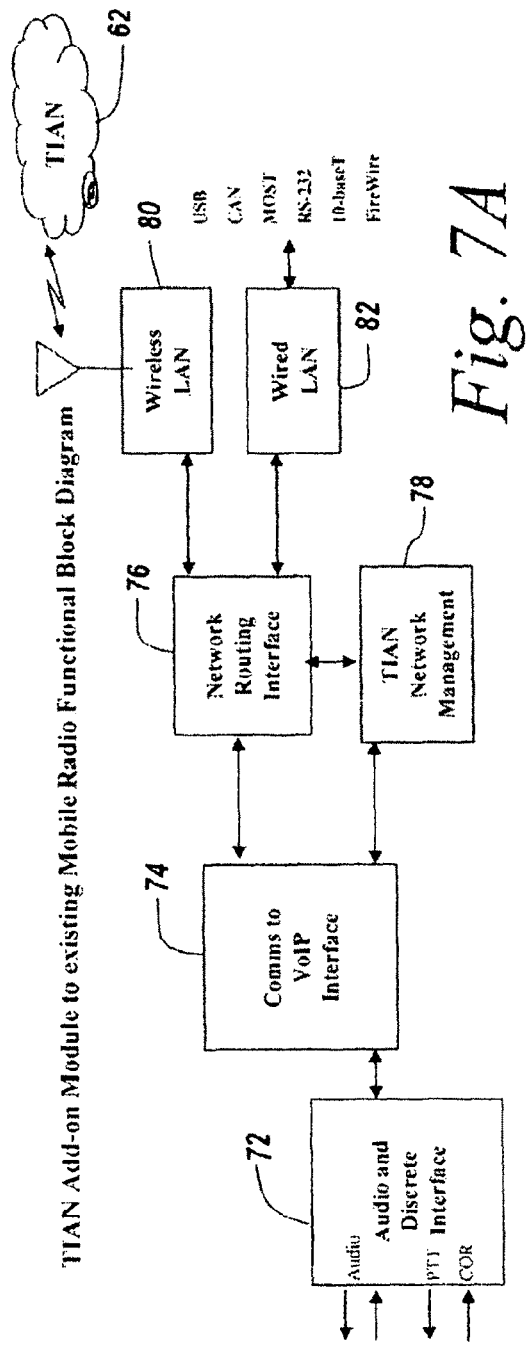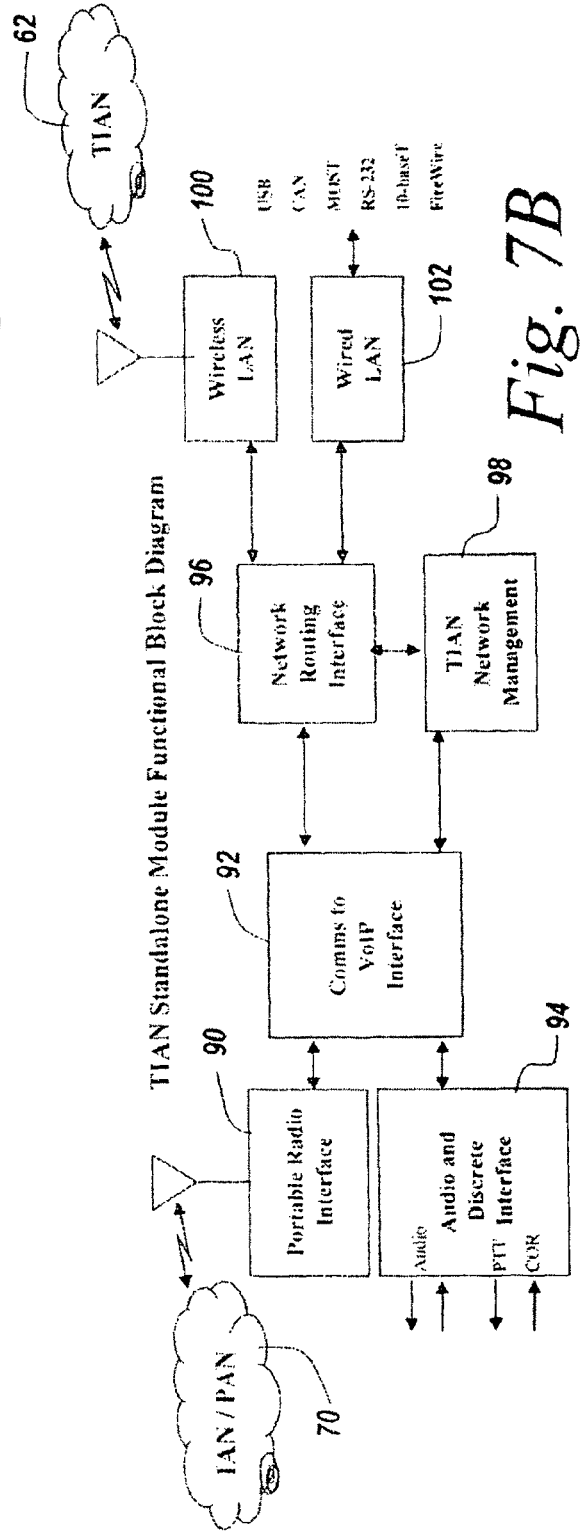
Fig. 7A — TIAN Add-on Module to existing Mobile Radio Functional Block Diagram
Fig. 7B — TIAN Standalone Module Functional Block Diagram

MOBILE TEMPORARY INCIDENT AREA NETWORK FOR LOCAL COMMUNICATIONS INTEROPERABILITY

RELATED APPLICATIONS

This application is a continuation of patent application Ser. No. 10/943,323 filed Sep. 17, 2004 now U.S. Pat. No. 7,508,840.

FIELD OF THE INVENTION

This invention relates to mobile communications and more particularly to an ad hoc module for establishing a temporary incident area network at a local scene of incident for communication interoperability through the responder's everyday standard issued portable communication units.

BACKGROUND OF THE INVENTION

In the field of first responder's emergency communications, especially when used by police departments, fire departments and emergency management personnel, when an incident occurs and the first responders converge on the scene of an incident, as is oftentimes the case, communication units carried by the first responders are so dissimilar that it is impossible to establish communication between all of the first responders at the scene. Moreover, in terms of homeland security, the first responder's communication units are incompatible from those used by various government departments such as the Federal Bureau of Investigation, the Central Intelligence Agency, and the Department of Defense, as well as any commercial off-the-shelf equipment such as cell phones used, for instance, in public communications.

When multiple agencies arrive on the scene of an incident, there is virtually no ability to locally communicate between the various agencies regardless of any homeland security structure due to the complete lack of interoperability between the communication units used by the various agencies. What happens at the scene of an incident is the complete inability of the various agencies to talk to each other or to understand what is going on at the scene, much less to receive instructions as to what to do.

For instance, frequency channels and bands allocated for a local police department are different from those allocated to the fire department, or indeed to the emergency rescue teams. Not only are different frequencies allocated for different local modules, but also the modulation and protocols vary substantially from one communication unit to the next. For instance, much of the equipment may use analog radio channels, whereas more sophisticated equipment uses digital air interfaces. Thus, the problem of having the individual communication units communicate with other communication units is an almost insurmountable problem.

What most of the independent departments or agencies have are communication units that establish a communication link between the particular agency first responders and the agency's dispatcher over a closed network having a base station oftentimes removed from the incident location. Sometimes it is impossible for communication units on the scene to communicate with their command structure through the base station tower due to range or interference conditions, even if all the personnel from the same agency can communicate with each other over an incident area network.

The result is that when various agencies or communication units arrive at the scene of an incident, the only way that interoperable communications can be established is by either handing out communication units that interoperate to the responders at the scene so that they can communicate with each other, or a specialized van or truck is wheeled up to operate as a local switch or gateway. The logistics of this solution greatly limits the effectiveness and ability to interoperate.

The problem of providing an entire new set of communication units for each incident is cost, operator familiarity with the communication units, network capacity, and deployment time. By all accounts the handing out of new communication units at a scene is too costly. Also the transportation and setup of such large amounts of equipment to one particular spot for a given incident presents other limitations and accessibility issues. Moreover, the problem of having a specialized van or truck is that a large geographic region may have only one or two such vans available. It may take quite some time for the van and equipment to get to the scene of the incident. The equipment on the van may not be compatible with the existing radios at the scene and it may take quite some time to be able to establish interoperability with the available communication units at the scene.

Thus, the problem, in general, is to be able to provide interoperability at a local scene and to make the operations seamless to the operator so that it becomes an everyday event for personnel involved. The system must not involve anything of a specialized nature that requires an individual to learn how to use the equipment. Most importantly, the interoperability solution must be an everyday event that is automatically configured and deployed and not require specialized vehicles or equipment or specialized support personnel at the scene of incident.

SUMMARY OF INVENTION

This invention allows interoperability at the scene of incident through an autonomous temporary incident area network (TIAN) while allowing the responding agencies to utilize their standard issued communication units. The invention consists of a TIAN module that communicates with each responder's communication unit and forms an ad-hoc network between TIAN modules for the routing of traffic between responding agencies. The TIAN module can reside within the responder's vehicle or may be easily deployed as the responders travel throughout the scene of incident.

Rather than handing out individual communication units at an incident scene and rather than trying to interconnect the communication units that exist at the scene with a switch that is hauled in to accommodate them, in the subject invention each of the vehicles responding to the scene is configured as standard equipment with a universal TIAN module to which his or her communication unit wirelessly interfaces too.

In operation, the TIAN module sets up the wireless temporary ad hoc network with other TIAN modules as the local scene of incident, allowing the dissimilar agencies' communication units to communicate wirelessly over the TIAN. The TIAN nodes reside at the scene of incident either in the first responder's vehicle or statically placed throughout the scene of incident, for instance on a stair landing, behind a building, or on different floors of an incident building. Thereafter, additional first responders can interoperate through their respective TIAN modules as they arrive on the scene. Interoperability occurs because all of the TIAN modules can communicate with one another and because of their universal nature of interfacing with the first responder's communication units.

Note that first responders can interoperate with each other first because they can communicate with their own agency communication units, and secondly because their communication units can communicate with each other over the ad hoc temporary incident area network through the TIAN modules. Thus a common communications protocol between TIAN modules allows disparate communication units to intercommunicate. Note that the TIAN does not rely on a large infrastructure or bigger underlying network. It automatically creates an ad hoc TIAN right at the local scene and it allows dissimilar communication units to pass voice, video, and data.

Note that there is no change to the standard issued communication units that the first responders carry with them. Basically, with a switch on his communication unit, the first responder activates the communication unit to TIAN module interface. This allows the first responder on the scene to communicate with the TIAN module that resides in his vehicle or elsewhere at the incident scene. The TIAN module receives the signal from the communication unit that this first responder is carrying, digitizes the signal, packages it up, and sends it over the newly established TIAN to other agencies' TIAN modules. In one embodiment, the routing of traffic over the TIAN is through IP-type packets and IP addressing however the IP addressing is dynamic and need not be hard-coded.

As will be appreciated, the communication unit that the first responder normally carries or uses may have certain frequencies allocated to him, for instance, for use in a general region. The communication to TIAN module wireless link may be over the agency's dedicated frequency channels or one of the interoperability channels that are already assigned for that area or region, such as for local fire or police. The associated TIAN module is programmed to establish a wireless link with the first responder's communication unit using the agency's preferred protocol or a general interoperability protocol that is supported by the communication unit. The TIAN module then performs a gateway function between the communication unit's protocol and the TIAN protocol. The result is that one agency communication unit using one set of frequencies and protocols can talk to another agency communication unit having a totally different set of frequencies and protocols. This means that police from one jurisdiction can talk to firefighters and police from another jurisdiction without having to provide compatible radios.

On the TIAN module network side, the TIAN module is a node in an ad hoc network. The TIAN wireless link may be over an IEEE 802.11 protocol and frequency or over a dedicated public safety 700 MHz wideband channel or over a dedicated public safety 4.9 GHz broadband channel or over any combination of channels and protocols. Moreover, it will be appreciated that there are several military and government agency frequencies that are available on a universal basis to provide TIAN module wireless communications.

When the first of the vehicles used to transport personnel to the scene arrives at the scene, the vehicle resident TIAN module creates a wireless ad hoc network at the local scene such that when other modules arrive at the scene, they enter the network through an ad-hoc discovery, registration, addressing, and routing process thus it is not necessary to have pre-knowledge of who will arrive at the scene of the incident. Also, when a first responder leaves the scene, the TIAN module will logout of the TIAN and the network topology will be automatically adjusted.

By ad hoc is meant that the network does not support any centralized coordination nor any fixed infrastructure. The ad hoc networks can be set up on the fly at any place with the nodes being the responders' TIAN modules. The TIAN module addresses are automatically and dynamically assigned at the scene. The routing table or topology is established automatically at the scene and is automatically updated as TIAN modules enter and leave the scene. The TIAN modules route voice, video, and data to each of the other TIAN modules to allow agencies with dissimilar communication units on the scene to intercommunicate.

Even without a commander immediately on scene, the various responders and agencies have the ability to automatically communicate with each other over the TIAN. As the scene grows and the local incident commander arrives at the scene, the incident commander can take command and control over the TIAN. The centralized commander can be made aware of information from all of the agencies at the scene. A command structure can be set up locally by an incident commander so that talk group routing between responders can be established and commands/control can be routed to particular agency by a commander.

The subject system does not require the issuing of new equipment, but lets first responders use their existing communication units such as mobile radios and portable radios. Thus, what is provided is a separate box, a TIAN module, in each vehicle to interface to the communication unit through a wireless RF link or directly through the unit's audio or data ports as well as push-to-talk lines. The TIAN module provides a common air interface to interconnect all of the TIAN modules, using an open protocol in one embodiment.

In order to make sure that there is interoperability between all of the TIAN modules arriving at a scene, each of the first responders uses a vehicle equipped with one of these universal TIAN modules. The TIAN modules themselves are sufficiently inexpensive so that they can be standard issue equipment that is distributed throughout departments and agencies.

The result is that personnel arriving at the scene can use the everyday equipment that they are familiar with, as diverse as it may be, with the expectation that with no training they can communicate with each other at the scene.

It is a feature of the subject invention that since the TIAN modules are meant to operate on the vehicle's own battery power, the range of the first responder's radio can be increased by the output power of the temporary incident area network modules. More particularly, if, for instance, responders are required to go into high-rise office buildings, there may be difficulty communicating between floors. In order to address this issue, portable TIAN modules having self-contained batteries may be distributed to various floors so that the handheld radios that the individuals use can have their range extended by communicating from the communication units to the TIAN module that is placed on the floor and thence to other TIAN modules.

The subject system avoids having to have a specially equipped van pull up to the scene and to have to go and find out about the radios being used, including type of radio and frequency band. It also avoids having to plug in various compatible radios into a van and manually tweak the network to make it work properly.

What is done by the subject system is to automatically create the ad hoc network when the vehicles pull up and are in range of each other. This establishes an open-air interface type of network in which no tweaking or adjustment need be made.

Thus, the first responders are able to talk to each other regardless of the agency they belong to, and regardless of the equipment they are initially issued. They can also communicate regardless of the particular command structure imposed by their agencies or departments. The subject system involves an ad hoc connection and routing scheme to allow the new temporary incident area network modules to communicate with each other.

In summary, an ad hoc interoperability emergency communication network is established by providing universal temporary incident area network modules that communicate with each other on a common standard network, with the network established when vehicles containing the temporary incident area network modules are within range of each other. The temporary incident area network modules are such as to have an RF or other connection with handheld or in-vehicle communications units which have standard voice, data and push-to-talk channels. The system thus allows communications amongst the responders to an incident without having to set up pre-arranged protocols, equipment compatibilities, or equipment addressing. Moreover, command and control structure can be achieved through a commander having access through his own temporary incident area network module to be able to route and control the flow of information over the ad hoc net. As a result of the use of the ad hoc net, portable temporary incident area network modules are provided with increased range. Moreover, in one embodiment, switches are provided on the responders' transceivers to enable responders to switch between the ad hoc temporary incident area network and the closed network of the department for whom the individual works.

BRIEF DESCRIPTION OF THE DRAWINGS

These and other features of the subject invention will be better understood in connection with a Detailed Description, in conjunction with the Drawings, of which:

FIGS. 7A and 7B are functional block diagrams of the subject temporary incident area network for add-on and standalone embodiments of the subject invention;

DETAILED DESCRIPTION

In order to facilitate the description of the subject invention, the following definitions are provided:

Extended Area Network (EAN)—The city systems are in turned linked with county, regional, state, and national systems or extended area networks.

Jurisdiction Area Network (JAN)—The JAN is the main communications network for first responders. It provides a communication path for all first responder's communication units within a specific agency. Examples of a JAN are the communication system used by the NH State Police that is different from the JAN communication system used by the Hudson Fire Department that is different from the communication system used by the US Border Patrol.

Incident Area Network (IAN)—An incident area network is a network created for a specific incident by the responding agency. This network is temporary in nature and comprises all of the first responders from a specific agency. For example, the Hudson Fire Department will create a IAN so that all of their fire fighters can communicate at the local scene. The Hudson Fire Department IAN will not interoperate with the Hudson Police Department's IAN that is being used at the same scene to allow the responding policemen to communicate over.

Temporary Incident Area Network (TIAN)—As public safety individuals and resources, such as ambulances and fire engines, come into an incident, the TIAN modules will automatically recognize the new responder, register them into the network, and authorize the network resource for communications and information exchange. The TIAN modules will provide a gateway function between each of the agencies IAN at the local scene.

Personal Area Network (PAN)—On the small scale, the PANs consist of network devices that interact with other devices that belong with the public safety individual. A first responder may be equipped with devices that are used to monitor the first responder's physical location, pulse rate, breathing rate, oxygen tank status, as well as devices for hazardous gas detection and voice communications. The devices are linked on a personal area network controlled by the first responder's communication unit.

Figure 1:
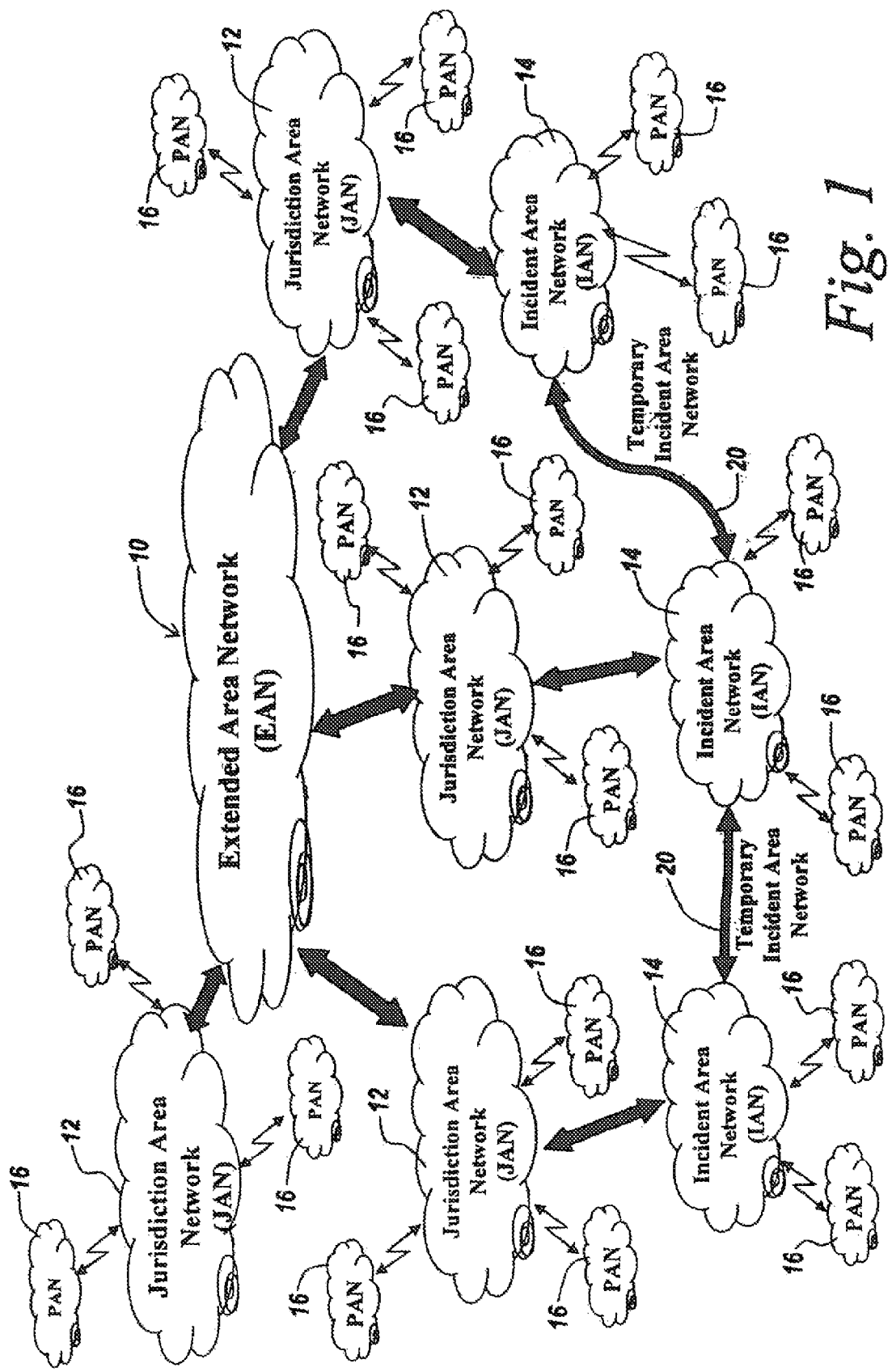
FIG. 1 is a hierarchical network structure diagram starting with an extended area network, and going down through a jurisdiction area network, to a personal area network connected to the other networks through an incident area network.

Referring now to FIG. 1, communication elements and the interconnection between elements as depicted as an hierarchal network structure with a PAN being the lowest level and an EAN being the highest level.

As can be seen in this figure, an extended area network 10 is coupled to jurisdictional area networks 12 that are in turn coupled to incident area networks 14 as illustrated. PANs 16 are coupled to respective incident area networks or jurisdiction area networks, with the incident area networks being interconnected by a temporary incident area network designated by reference character 20 as will be described.

IANs are created at the scene of an incident and each first responder's agencies may create their own independent IANs. The isolated IANs are typically due to communication unit's dissimilar operating frequencies and protocols. The temporary incident area network connections are created by the TIAN modules to provide interoperability between IANs at a scene of incident.

Figure 2:
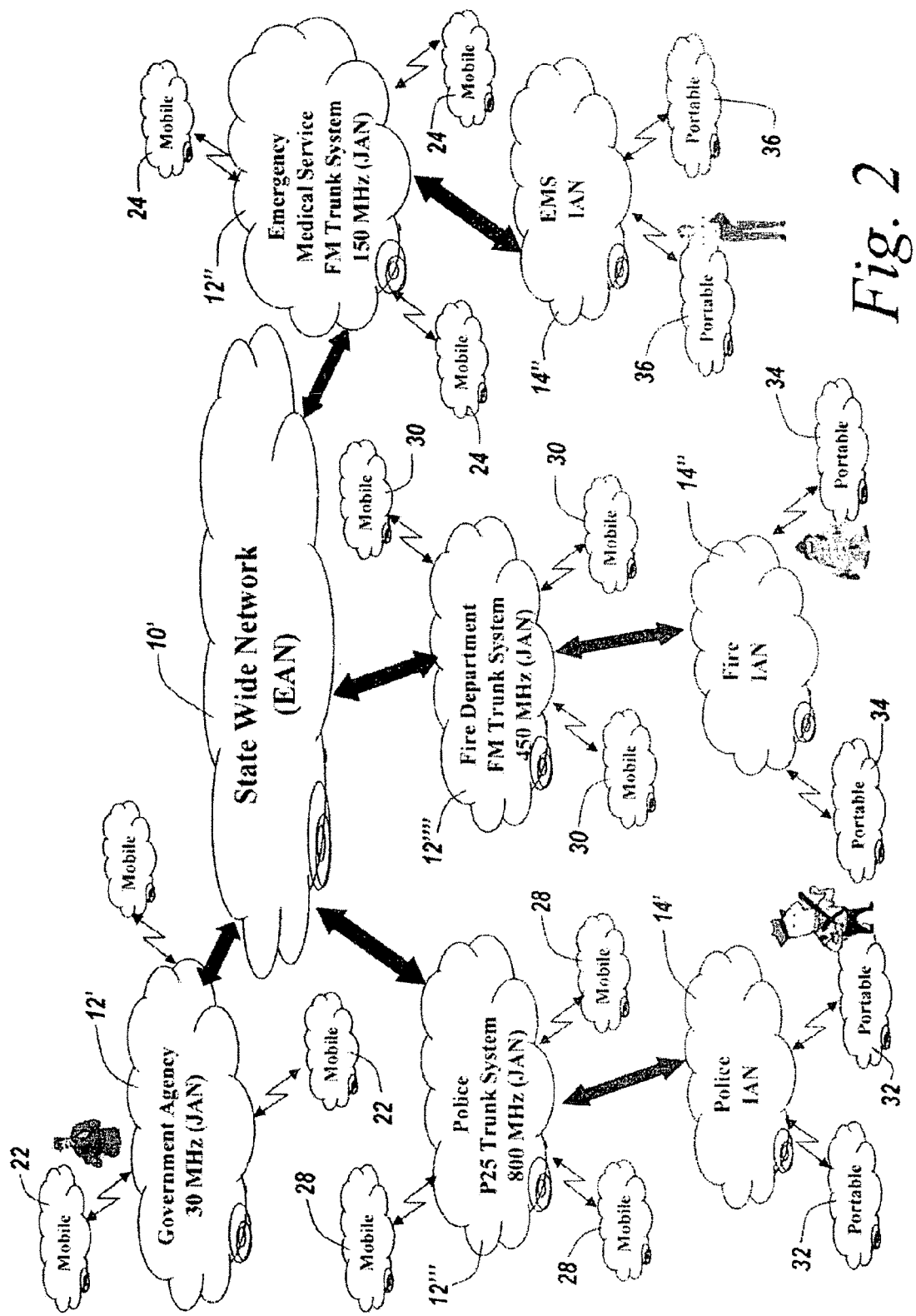
FIG. 2 is a hierarchical network structure diagram for an incident involving police and fire departments using the topology of FIG. 1.

Referring now to FIG. 2, for an everyday scenario it can be seen that a statewide network 10' constitutes the extended area network for a particular scenario that can involve governmental agency 12' forming a JAN that communicates with its PANS 22, which may be mobile units operating, for instance, at 30 MHz. Another JAN 12" constitutes an emergency medical network using an FM trunk system at 150 MHz, which has its mobile units 24 connected thereto by RF links or otherwise. A further JAN 12''' could be a police network using a P-25 trunk system operating at 800 MHz, with its mobile units 28 connected thereto. Likewise in the incident, a still further PAN 12'''' might be a fire department using an FM trunk system operating at 450 MHz, with its mobile units 30 also connected to the fire department trunk system.

The police, fire department and EMS units may desire to set up incident area networks, with the police IAN identified by reference character 14', the fire IAN by reference character 14'' and the EMS IAN by reference character 14'''.

Each of the IANs support portable units respectively 32 for the police, 34 for the fire, and 36 for the EMS.

In operation, if one applies the communication systems that are available today for an everyday scenario like a residential fire call, the communication elements may be as illustrated. For the Policemen to communicate with the Firemen, the communication path is from the Policemen's communication unit (portable radio) through the Police IAN to the Police JAN to the county's EAN to the Fire JAN to the Fire IAN and finally to the Firemen's communication unit. Communication routing between the Firemen and EMS personnel is also as complex. Most of the communication path is away from the local incident with vulnerabilities such as access point congestion and message delays. The use of the ad hoc TIAN right at the local scene relieves the problems associated with an extended communication path away from the local incident.

As mentioned hereinbefore, responding to a local incident has involved rolling in specialized communication vehicles or distributing portable radios or PAN devices that interoperate. Moreover, there are everyday operation issues associated with these approaches. Specialized vehicles are expensive, limited, and may take time to arrive at the scene and more time to setup the temporary network. Distributing specialized PAN devices also has everyday operational issues such as programming and configuration as well as lack of user familiarity.

Figure 3:
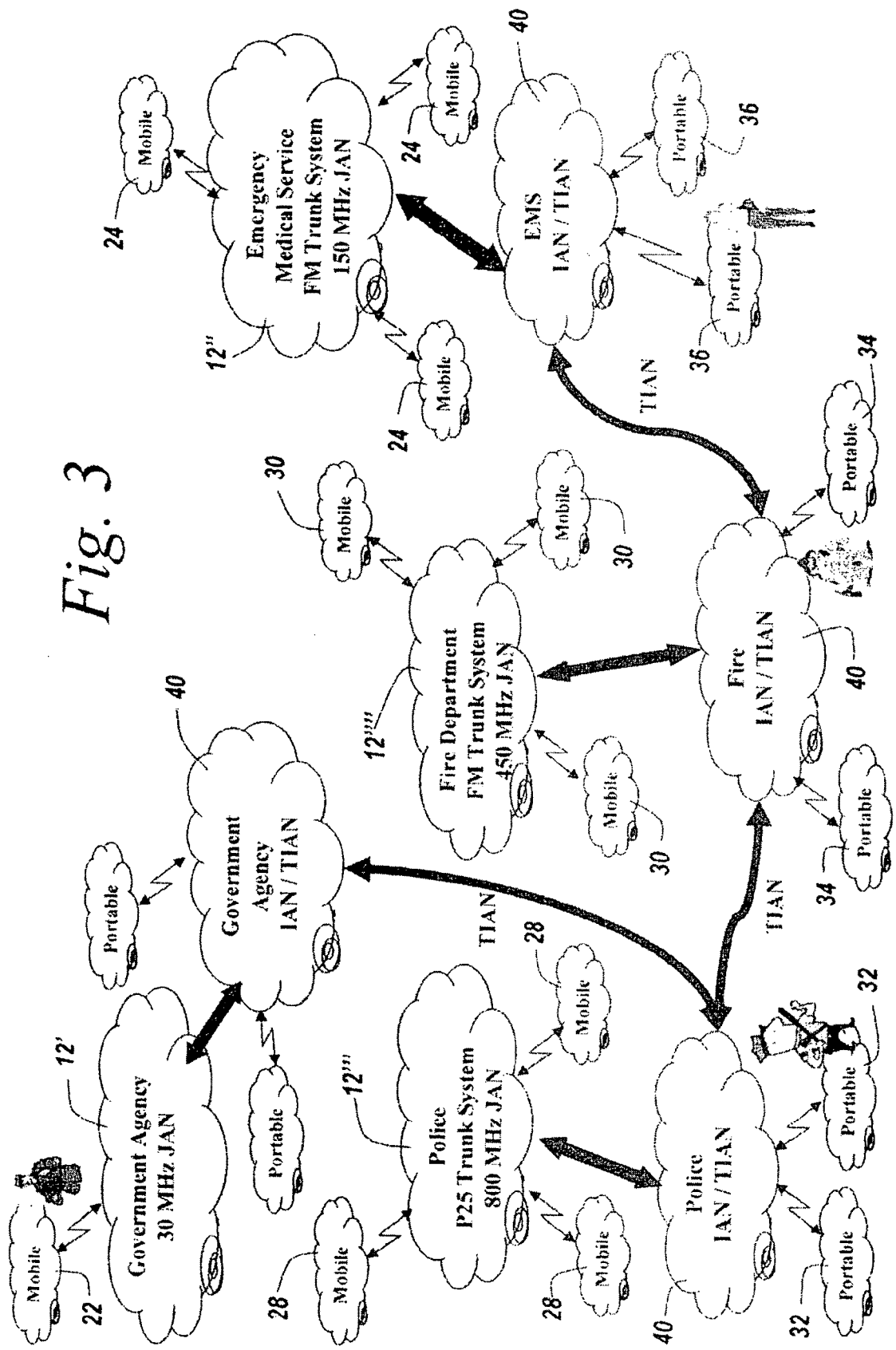
FIG. 3 is a hierarchical network structure diagram in which the incident area networks of FIGS. 1 and 2 are established by the subject temporary incident area network modules.

As shown in FIG. 3, as can be seen, each of the governmental agencies, police departments, fire departments or EMS units, substitutes for their IAN a temporary incident area network or TIAN 40. This is accomplished by the use of universal TIAN modules that provide each of the entities with the ability to intercommunicate. Although each IAN/TIAN can communicate directly over their own proprietary network with its corresponding intergovernmental agency, such as JAN 12', JAN 12'', JAN 12''' and JAN 12'''', it is the links between the universal TIAN modules that provide the ad hoc network.

Thus, all communications between all of the agencies and personnel are routed through the TIAN modules. As illustrated, the temporary incident network area or TIAN of the subject invention solves the temporary network issue by building a temporary local area network to interconnect IANs right at the scene of the incident. This is accomplished by adding TIAN modules into an incident area network or IAN. When the first responder arrives at the scene, the TIAN module within the first responder's vehicle establishes a TIAN and monitors for other first responders to arrive at the scene of incident. As other responders arrive, their TIAN module connects to the TIAN in an ad-hoc fashion. The TIAN modules automatically share their JAN/PAN personalities and then communication is established between IANs and PANs. Voice, data, and video may be shared between PANs over the TIAN.

When the Incident Commander (IC) arrives at the scene, the IC's temporary incident area network system will connect over the temporary incident area network TIAN and then will be presented with information on all of the subscribers on his PAN device. The IC can than take command of the scene and communicate with all of the first responders. The IC may create various talk groups among the responders, obtain status of all subscribers, and take command of the incident.

Figure 4:
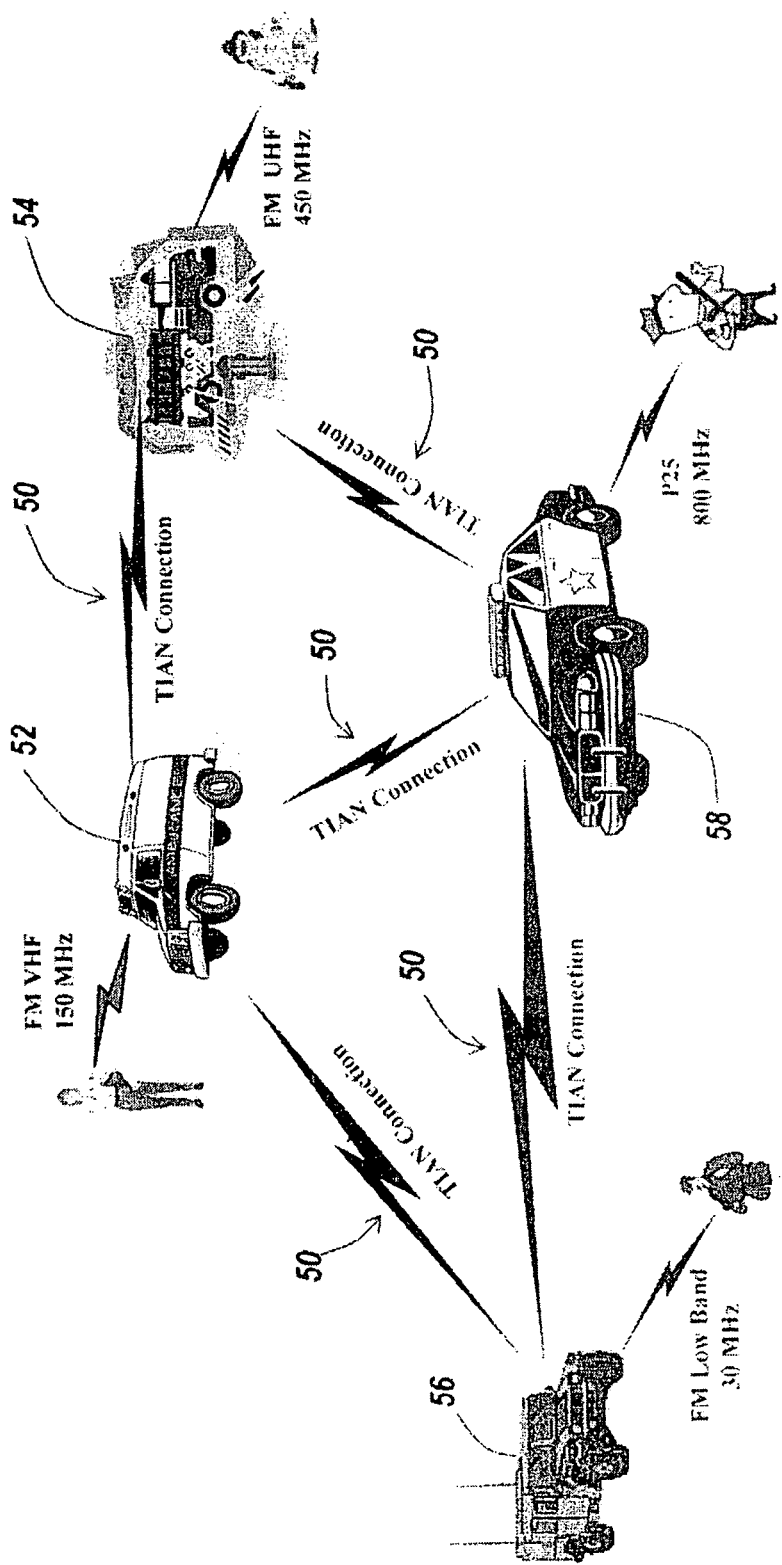
FIG. 4 is a diagrammatic illustration of the elements of a temporary network connections formed by first responders comprising police, military, EMS and fire personnel as they converge on an incident.

Referring now to FIG. 4, what is shown are the connections associated with a temporary incident area network. Here it can be seen that TIAN connections 50 are established, for instance, between an ambulance 52 operating with an FM-VHF carrier at 150 MHz, which may wish to communicate, for instance, with fire department personnel in a fire truck 54, which is designed to operate over an FM-UHF 450 MHz channel. Likewise, military personnel, for instance, in a Hum-V 56 that normally communicates over an FM low band at 50 MHz may wish to communicate with a squad car 58 that usually communicates with its personnel on the P-25 800 MHz channel.

What can be seen is that each of the entities shown in FIG. 4 communicates with its personnel over its own dedicated proprietary network, each with a different frequency, to say nothing of different protocols.

If one breaks down the TIAN into a lower level, what is actually happening is that a temporary ad hoc wireless area network is established between each of the responding vehicles right at the scene of incident as shown in FIG. 4. Each vehicle's TIAN module is a node within the mesh network and can be used for routing traffic and extending the networks range. Applying adaptive routing protocols, quality of service, and bandwidth broker techniques optimized the TIAN throughput and efficiency.

Temporary Incident Area Network System and Operation

Figure 5:
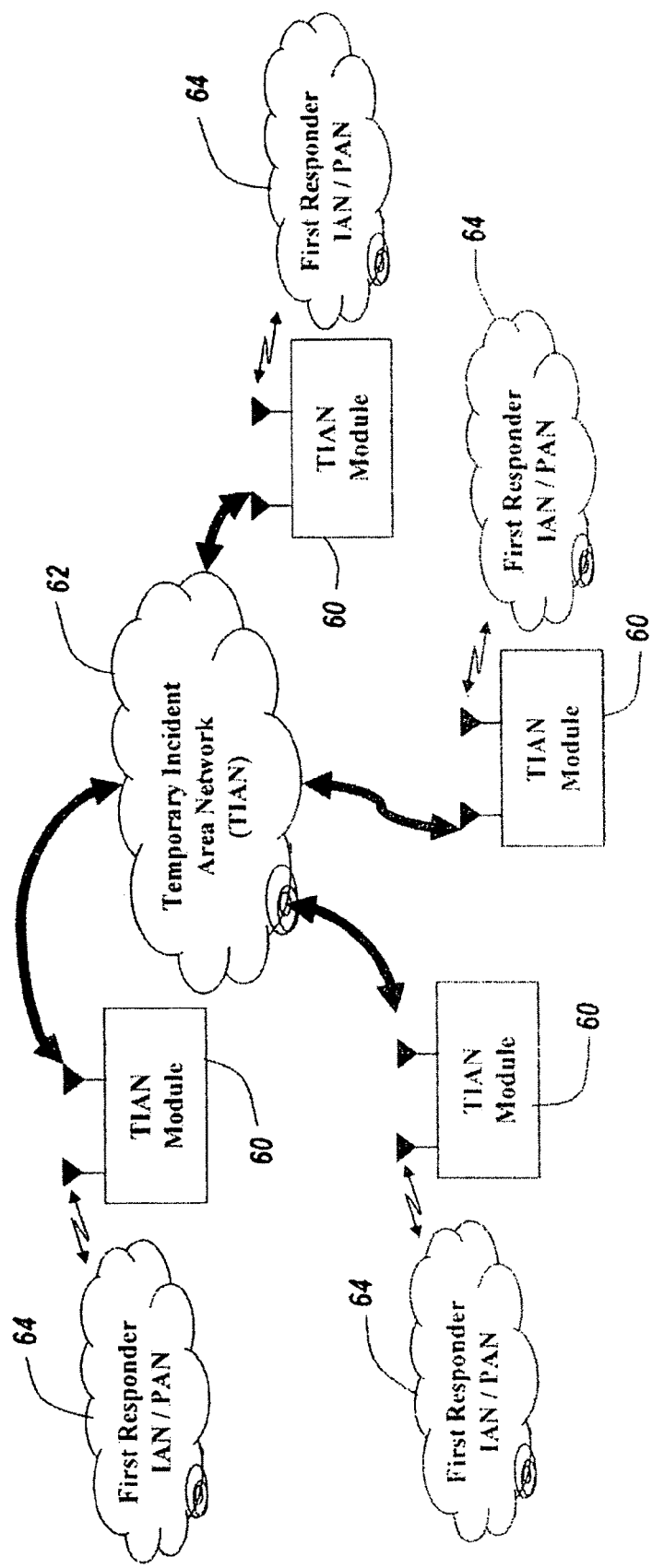
FIG. 5 is a diagrammatic illustration of the use of temporary incident area network modules to interconnect personal area network communications devices.

As shown in FIG. 5, a TIAN system consists of a number of TIAN modules 60 that form a temporary area network 62 and provide a gateway to dissimilar IANs. The TIAN system allows mutually exclusive first responder PANs 64, usually comprising portable radios, to interoperate at a local scene. Here each of the first responders is provided with the subject universal TIAN module.

Temporary Incident Area Network Module

Figure 6A:
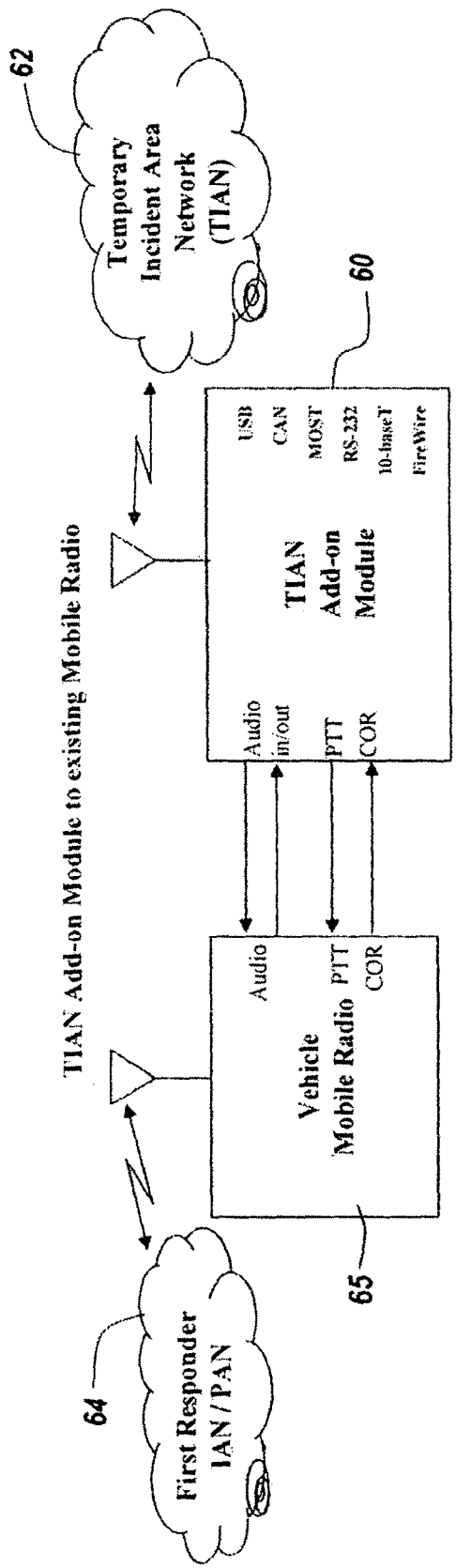
FIGS. 6A and 6B are diagrammatic illustrations respectively of add-on modules to existing mobile radios or standalone modules.
Figure 6B:
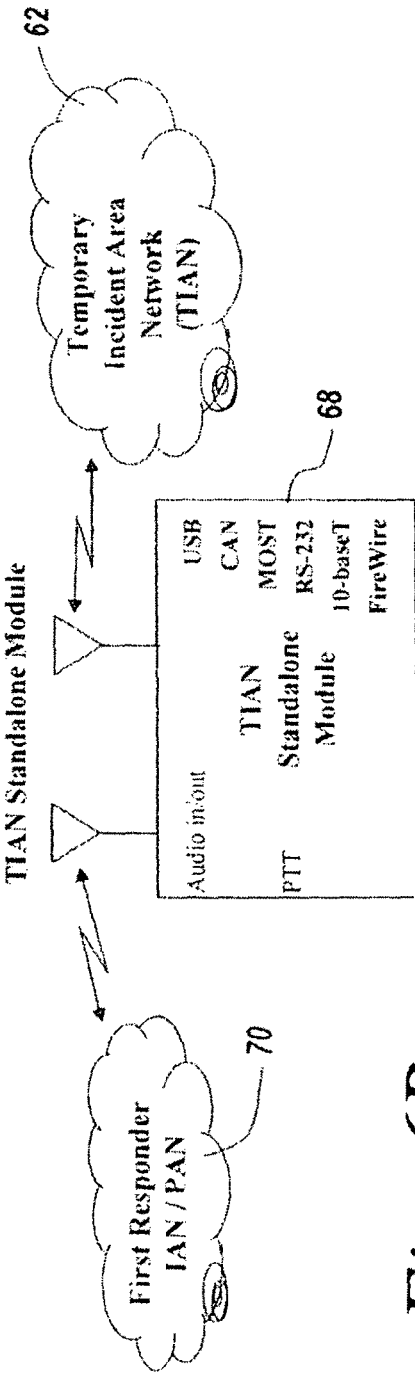

Referring to FIGS. 6A and 6B, in one embodiment the TIAN module 60 will reside within the first responder's vehicle as an add-on to the existing vehicular mobile radio 65 or as a standalone system 68. The TIAN add-on module interfaces to mobile radio 65 through standard Audio, PTT, and optional Carrier Operated Relay or COR interfaces while the TIAN standalone system 68 provides the wireless interface to the first responder's PAN, here illustrated at 70.

The TIAN module will optionally provide standard wire network interfaces or standard automotive network interfaces. The network interfaces can provide a laptop interface, mobile radio control interface, vehicle electronics interface, camera interface, or allow the TIAN module to act as a gateway between public safety electronic equipment.

Referring now to FIGS. 7A and 7B, TIAN functional block diagrams are presented. The add-on vehicular mobile radio interface is provided through the Audio and Discrete Interface 72. The Audio and Discrete Interface 72 is coupled to a Comms-to-voice voice-over IP interface or VoIP interface 74, which is in turn interconnected to a network routing interface 76 and also to a TIAN network management 78. The network interface is interconnected to a wireless LAN 80 or to a wired LAN 82, in one embodiment using a USB, CAN, MOST, RS-232, 10-based T and fire-wire protocols.

As to the standalone version of the subject system, a portable radio interface 90 is coupled to a Comms-to-VoIP interface 92, with an Audio and Discrete Interface 94 also interconnected with the Comms-to-VoIP interface. VoIP interface 92 is also coupled to a network routing interface 96 and to a TIAN network management 98 similar to the network routing interface 76 and TIAN network 78 for existing mobile radio functionality. Likewise, the network routing interface is interconnected with wireless LAN 100 and wired LAN 102, as was the case with the existing mobile radio scenario.

In operation, the Audio and Discrete Interface provides audio to digital conversion and digital and audio conversions with associated audio processing and filtering that is required in the public safety environment. Discrete signals are also provided to activate the vehicular mobile radios put-to-talk signal and to monitor the Carrier Operated Relay signal.

The Portable Radio Interface 90 is part of the temporary incident area network standalone system to support the ANSI/TIA-603-B Land Mobile FM or PM Communication Interface and the ANSI/TIA/EIA 102 APCO Project 25 Common Air Interface in direct system mode.

The Comms to VoIP Interface function provides the all of the VoIP functionality as well as voice detection processing. The voice detection processing monitors the audio signal input from the Audio and Discrete Interface and when audio is detected the Comms to VoIP Interface function processes the voice and generates VoIP packets that are transmitted to the Network Routing Interface. When the Comms to VoIP Interface function receives VoIP packets from the Network Routing Interface function, the VoIP packets are processed, the PTT signal is activated, and the audio signal is passed to the Audio and Discrete Interface audio output.

The Network Routing Interface provides the network routing function and data streaming path between the TIAN modules functions. The Network Routing Interface receives routing configurations from the Temporary Incident Area Network Management function.

The Wireless LAN function provides the wireless interface to other TIAN modules. This function conforms to standard wireless protocols and air interfaces such as WiFi, 802.11, Bluetooth, and/or TIA-902. The Wireless LAN function provides a level of security.

The Wired LAN function provides an interface to standard network wire interfaces. The standard wire interfaces can provide vehicle electronic equipment broader band access over the TIAN at the scene of incident than can be achieved through the current Public Safety wireless infrastructure. Vehicle electronic equipment can include laptop computers, siren control panels, vehicle accessories, vehicle sensors, video cameras, video monitors, personal area network, local wire-line access, and cellular radio equipment.

The Temporary Incident Area Network Management function provides the all of the operational mode processing that will be described in the following section.

Temporary Incident Area Network Operational Mode Processing

The TIAN is an ad-hoc network that is temporally set up for the transfers of voice, data, and video between dissimilar first responders' IANs and PANs. The TIAN ad-hoc network is a fully distributed network that automatically operates with no centralized coordination and with minimal control overhead. Self organizing, multicasting, and mobility are key features of the network to provide transparent real time point-to-multipoint and multipoint-to-multipoint voice and data communications.

Figure 8:
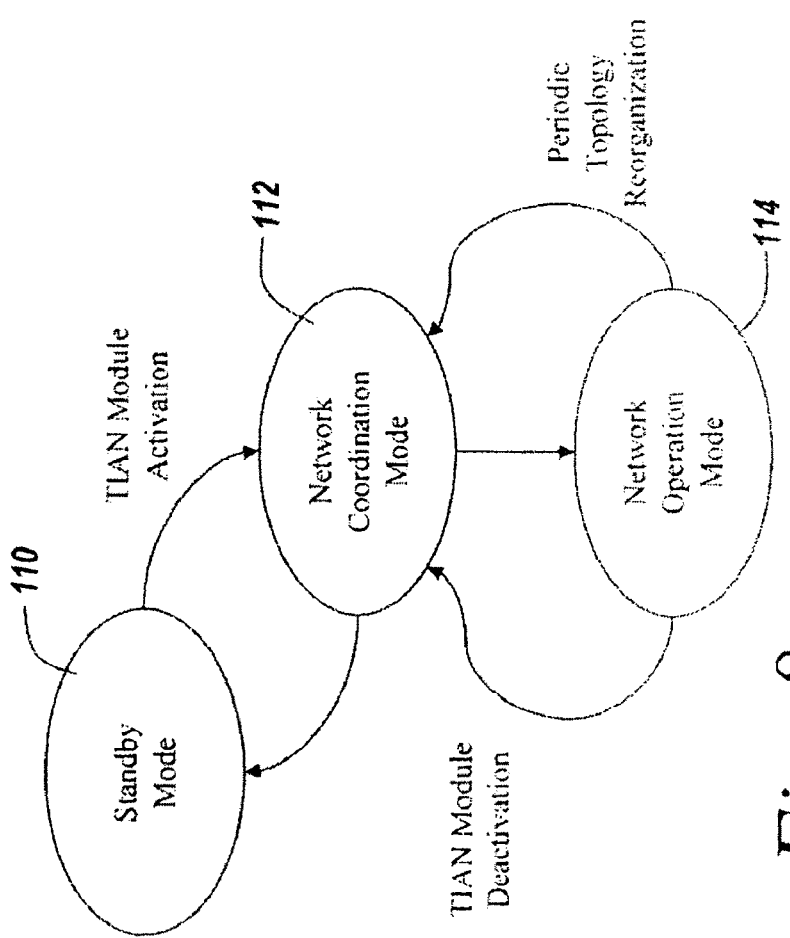
FIG. 8 is a network operational flow diagram for the subject temporary incident area network.

FIG. 8 provides the functional flow between the TIAN module's operational modes. In this figure, a Standby Mode 110 is shown interconnected to a Network Coordination Mode 112, in turn interconnected with a Network Operation Mode 114, with the diagram describing TIAN mobile module activation, TIAN module deactivation and periodic topology reorganization. The standby mode is the inactive state with the TIAN module asleep, with no active RF transmissions or RF reception. The Network Coordination Mode activates when the TIAN module is establishing, connecting, or updating the TIAN configuration. The Network Operation Mode is the state when the TIAN module is providing the gateway between the first responder's IAN/PAN and the TIAN.

Network Coordination Mode

After power is applied to the TIAN module and prior to arriving at the scene of incident, the TIAN module is in the standby mode. When the First Responders arrive at the scene of incident, they activate their TIAN modules by manually toggling a switch as they leave the vehicle or by an automatic process such as the depressing of the emergency break, driver seat sensor, placing the vehicle in park, or turning off the vehicle.

Figure 9:
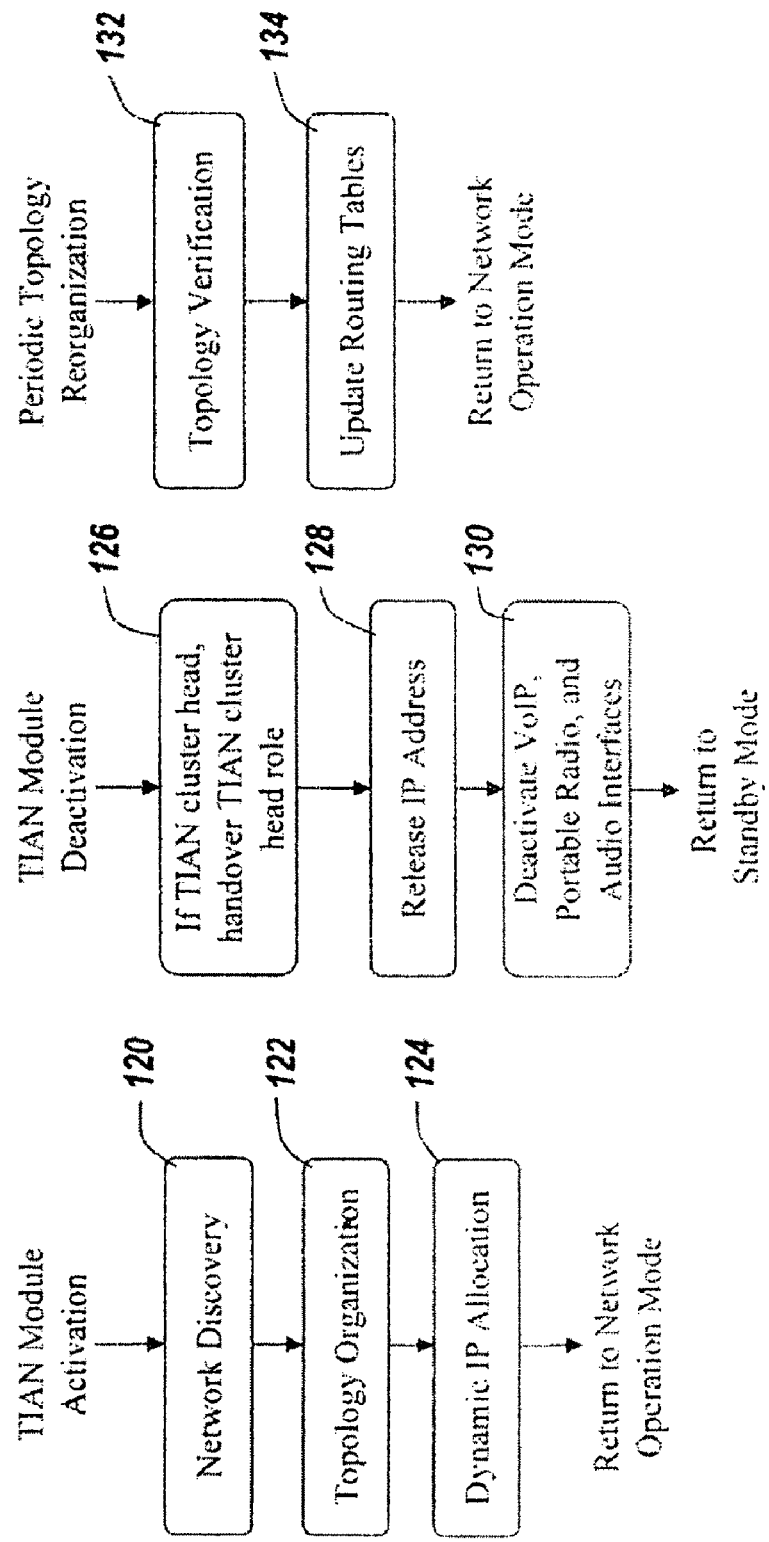
FIG. 9 is a flow chart illustrating the network coordination function of the subject temporary incident area network.

As illustrated in FIG. 9, once the TIAN module is activated, it will immediately enter the Network Coordination Mode and begin the network discovery phase 120 of operation. As shown, the discovery phase may be through a short packet transmission or beacon; or by sniffing the RF channel for network activity. When a network is discovered, the TIAN module enters the topology organization phase 122 where it collects information about their neighbors and the network. The module passes the TIAN module's identity and associated JAN/IAN parameters that the TIAN module is supporting. The topology reorganization phase is periodically performed so that node status can be updated and so that major topology changes can be detected and corrected.

Note that because each node within the TIAN must have a unique IP address, there is a dynamic IP allocation step 124 which is accomplished, upon which the system is returned to a network operation mode.

As illustrated at 126, for TIAN mode deactivation, if the TIAN cluster head leaves the scene, then it is necessary to hand over the TIAN cluster head roll, which involves releasing all IP addresses as illustrated 128 and deactivating VoIP portable radio and audio interfaces as illustrated at 130, at which point the system returns to the Standby Mode.

For periodic topology reorganization, as illustrated at 132, there is a topology verification mode and upon verification, routing tables are updated as illustrated at 134. After the periodic topology reorganization, the system is returned to the Network Operation Mode.

As noted above, each node within the TIAN must have a unique IP address to participate in the TIAN. Since the TIAN does not support a centralized coordination, a Dynamic Host Configuration Protocol (DHCP) cannot be supported. So a hierarchical network approach may be employed with the first module that arrives at the scene assuming the cluster head node role. When new TIAN modules arrive and discover the TIAN, they will register with the TIAN cluster head and the TIAN cluster head will allocate a new address and coordinates in a duplicate address (DAD) process. When the TIAN cluster head node is de-energized, it will automatically pass the cluster head role to a neighboring node prior to leaving the TIAN.

After the Network Coordination Mode has registered with and established a connection within the TIAN, the TIAN module will transition into the Network Operation Mode.

Network Operation Mode

Figure 10:
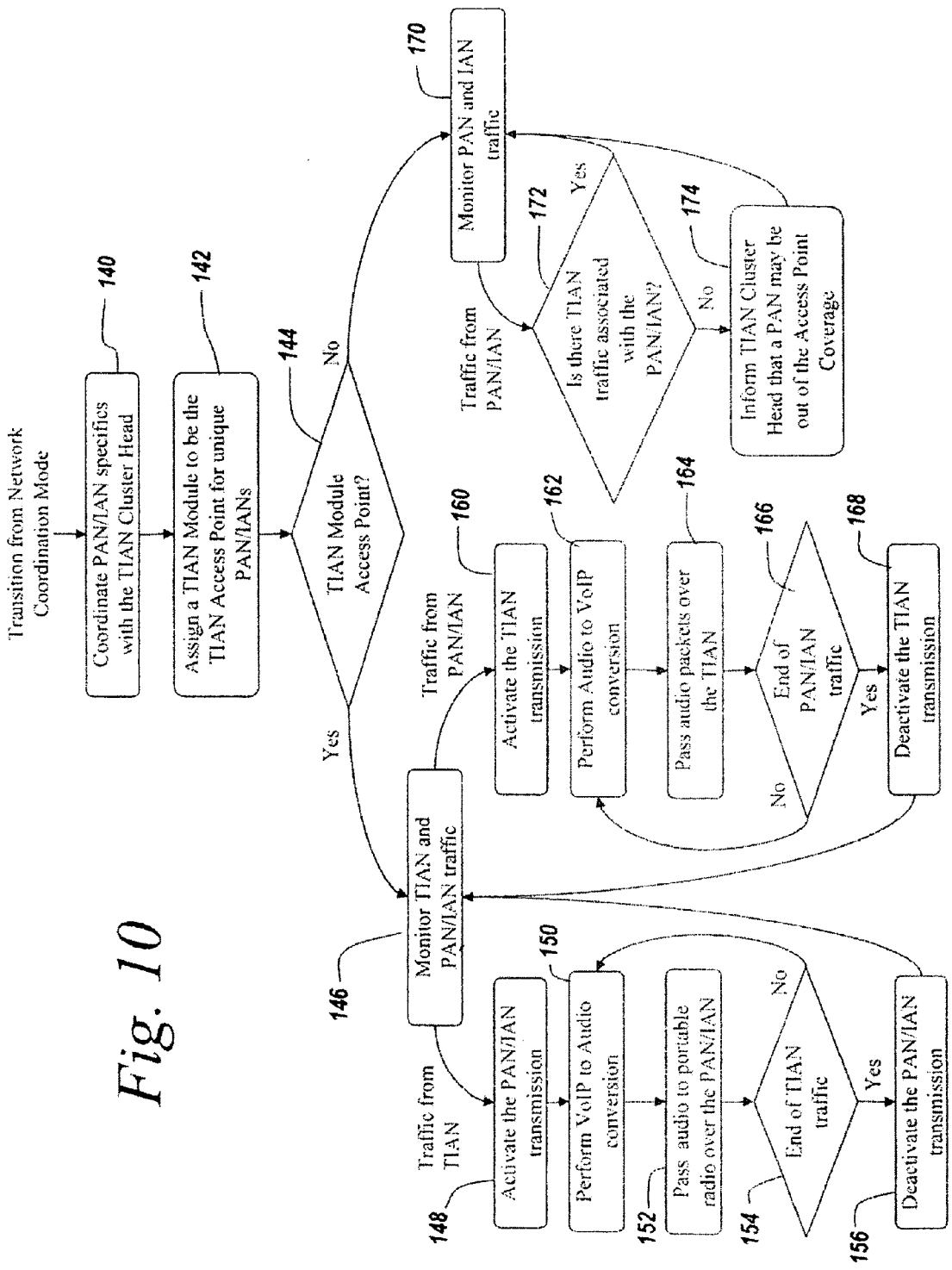
FIG. 10 is a flow chart showing the functional flow of the subject system in the networking operation mode; and, FIG. 11 is a diagrammatic illustration of a communications layout at the scene of an incident involving a response to a residential fire call.

Referring to FIG. 10, in terms of the network operating function, the transition from the Network Coordination Mode results in the coordination of PAN/IAN specifics within the TIAN cluster head, as illustrated at 140. Thereafter, the system assigns a TIAN module to be the TIAN access point for unique PAN/IANs as illustrated at 142. The system then determines whether or not there is a module access point as illustrated at 144. If there is, then as illustrated at 146 the system monitors the TIAN and PAN traffic. If there is traffic from the TIAN, then as illustrated at 148 the system activates the PAN/TIAN transmission, followed by performing VoIP to audio conversion at 150, which in turn passes the audio to portable radios over the PAN/IAN 152. A decision is made at 154 as to whether or not there is an end to TIAN traffic and if not, the unit 150 performs its indicated VoIP-to-audio conversion again. If there is an end to the traffic, then as illustrated 156, the system deactivates the PAN/IAN transmission and provides an indication to monitor 146.

If there is traffic from the PAN/IAN, then as illustrated at 160, the system activates the TIAN transmission, performs audio to VoIP conversion at 162 and passes audio packets over the TIANs as illustrated at 164. At the end of the PAN/IAN traffic, as illustrated at decision block 166, the system deactivates the TIAN transmission as illustrated at 168; whereas if the traffic has not ended, the audio-to-VoIP conversion continues.

If, on the other hand, there is no TIAN module access point, then as illustrated at 170, the system monitors PAN and IAN traffic. Traffic from PAN/IAN is monitored and as illustrated at decision block 172, if there is TIAN traffic associated with the PAN/IAN, then this fact is passed to monitor 170. If, on the other hand, there is no TIAN traffic associated PAN/IAN, then as illustrated at 174, the system informs the TIAN cluster head that a PAN may be out of the access point coverage. This is passed to monitor 170 as well.

Note that the Network Operation Mode is responsible for the transfer and routing of voice, data, and video from the first responder's IAN/PAN to the TIAN. The Networking Operation Mode process begins by coordinating the TIAN modules IAN parameters with the TIAN cluster head. Some of the IAN parameters consist of the JAN that the IAN is supporting, the frequency and CTCSS tone that the IAN is operating on, and the air interface protocol that the IAN is supporting. The cluster head will assign a TIAN module to be the TIAN access point for each unique IAN.

The TIAN module will process IAN/PAN network traffic differently depending on if it is assigned to be the TIAN access point for the associated IAN. If it is the TIAN access point, the TIAN module is responsible for providing the gateway function between the TIAN and the IAN/PAN. This consists of monitoring the networks for traffic, translating the traffic to the appropriate format, and the forwarding the traffic over the opposing network.

If the TIAN module is not assigned to be the TIAN access point, then it is to monitor the IAN and TIAN traffic to detect when an IAN subscriber PAN is out of range of the assigned TIAN access point. When the TIAN module detects IAN traffic but no associated TIAN traffic, the TIAN module is to inform the TIAN cluster head that it has detected an isolated subscriber device. The TIAN cluster head may then re-assign the TIAN access point to another TIAN module.

Fire Response to a Residential Fire Call

Figure 11:
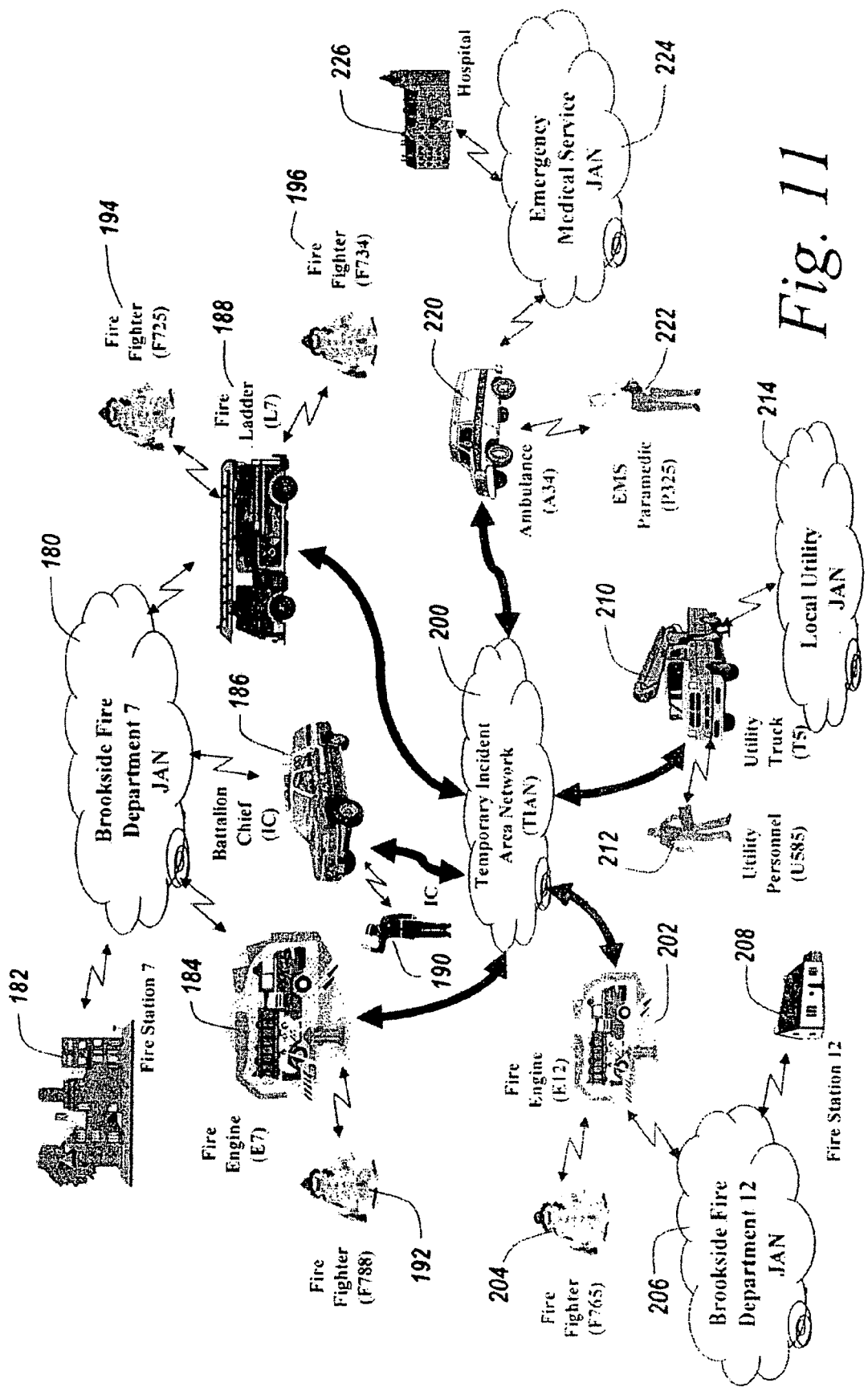

Presented in FIG. 11 is an example of how the subject TIAN works when applied to the "Fire Response to a Residential Fire Call" scenario presented in the "PSWC&I Statement of Requirements" Version 1.0 11 Mar. 10, 2004, section 3.3.2, pages 10 and 11 by The SAFECOM Program—Department of Homeland Security.

Referring now to FIG. 11, what is presented is the fire response to a residential call utilizing the subject temporary incident area network. Here it can be seen that a Brookside Fire Department 7 network, here illustrated at 180, communicates with fire station 182 and to, for instance, a fire engine E7 here illustrated at 184, a battalion chief incident commander vehicle 186 and, for instance, a fire ladder L-7 truck 188. Note that an incident commander 190 is in charge of the scene.

It will be further noted that a fire fighter F-788, here illustrated at 192, communicates with his fire engine 184, whereas fire fighters F-725 and F-734, here illustrated at 194 and 196 communicate directly with their particular fire ladder 188, that in return communicates over the subject temporary incident area network, here illustrated at 200. The TIAN 200 permits intercommunication between, for instance, fire engine 184, battalion chief 190 and fire fighters 194 and 196 through fire ladder 188.

Also responding to the scene may be an additional fire engine 202 having an associated fire fighter 765, here illustrated at 204, which may be associated with a different Brookside Fire Department, Brookside Fire Department 12 JAN, here illustrated at 206. JAN 206 is in turn interconnected with fire station 12, here illustrated at 208.

What the provision of the TIAN modules does is to permit fire station 12, fire fighter 204 and fire engine 202 to intercommunicate with all those at the scene, even though they are from a different fire department.

Moreover, a utility truck 210 may arrive on the scene with utility personnel 212, with utility truck 210 being connected on a different proprietary network to local utility JAN 214. Again, the TIAN module at utility truck 210 permits communication between utility personnel and the rest of the responders at the scene.

Likewise, an ambulance 220 may arrive at the scene. The ambulance transports EMS paramedics 222 to the scene, with ambulance 220 being connected over its own proprietary network to an emergency medical service JAN 224, in turn directly connected to a hospital 226.

The TIAN module at ambulance 220 interconnects the paramedic with his emergency medical service department and also the hospital, while at the same time permitting the EMS paramedic to interface with either utility personnel 212, fire fighter 204, incident commander 190 or other fire fighters 192, 194 and 196.

It is noted that in the following scenario, the "PSWC&I Statement of Requirements" have been annotated with temporary incident area network interactions.

The first section hereinafter presents the fire response scenario and the second section provides the SAFECOMM fire communications summary.

Fire Response Scenario

1. At 3:17 a.m., the Brookside public safety answering point (PSAP) receives a 9-1-1 call from a cab driver that the apartment building at 725 Pine is smoking and appears to be on fire. From the CAD display, the dispatcher finds that the BFD-7 station is available and close to the address. The dispatcher notifies BFD-7 to send E7 and L7, and to send BFD-7 battalion chief as the fire's incident commander (IC). As E7 is leaving the fire station, firefighter F788 jumps onto the back of the vehicle. The vehicle registers that F788 has become part of the E7 crew for accountability and tracking. The dispatcher simultaneously sends a digital message providing the apartment building's address. The dispatcher notifies another Brookside Fire Department, BFD-12, to also send an engine to the fire (E12). By 3:19 a.m., E7, L7, and the incident commander leave BFD-7 and report their status to the dispatcher. As the incident commander's command vehicle leaves the station, a nearby wireless PSCD sends the apartment's building plans and the locations of nearby fire hydrants, the building's water connections, the elevator, and the stairwells to the command vehicle's GIS. The dispatcher sends a reverse 9-1-1 call message to all residents of the building, which has eight apartments on each of three floors. The nearest ambulance (A34) is alerted by the dispatcher to proceed to the scene. The local utility is alerted to stand-by for communications with the IC at 725 Pine.

2. The E7, L7, and IC drivers view the apartment's address on the cab monitor displays, which also maps the route for the drivers; a computer-activated voice tells the drivers what lane to be in and which turns to make. As the fire vehicles approach traffic lights along the route, the on-board signaling system changes the lights to the emergency vehicles' favor and the geo-location system provides the vehicles' location and progress on the dispatcher's CAD display. The on-board system also interrogates the county's transportation system for road closures, blockages, train conflicts, or slow traffic conditions to route the vehicles around impediments and provide the fastest route to the fire.

3. The IC arrives on scene at 3:22 a.m., activates his TIAN module, assesses the situation, noting that smoke and fire are visible, and alerts dispatch that 725 Pine is a working fire. The local utility truck (T5) arrives on scene and activates his TIAN module that automatically connects in an ad hoc fashion to the IC TIAN module and establishes a temporary incident area network (TIAN). The IC directs the local utility over the TIAN to shut off the gas to 725 Pine. As L7 and E7 arrive and get into position, they activate their TIAN module which automatically connects to the established TIAN and all fire personnel and equipment are shown on the IC's GIS display. The TIAN modules automatically set up the tactical communications channels for the IC and the fire crews. The fire crews are able to talk continuously with each other, reporting conditions and warning of hazards. Because the apartment building is not large enough to require a built-in wireless incident area network for emergency services, the first fire crew into the apartment drops self-organizing wireless TIAN modules on each of the floors at they progress through the building. Soon E12 and the assigned EMS module arrive on site, activate their TIAN module that automatically connects to the TIAN. The new personnel and equipment are automatically registered over the TIAN with the IC commander and a communication path is established over the TIAN. FIG. 11 shows a communication layout at the scene of incident and how the TIAN provides a connection between the first responders from different responding agencies.

4. Several families have already evacuated the building. As firefighters ask for their names and apartment numbers, they use the voice recognition capabilities of their PSCDs to capture the information, applying an RF ID wrist strap to each resident to track their status and location. Other firefighters enter the building to guide survivors out and to rescue those who are trapped. The IR cameras on the firefighter's helmets pass video over the TIAN to provide the IC a view of fire conditions within the building and where the hot spots are located. Additionally, the firefighters monitor the temperature of the surrounding air in their location. This information is directly available over the TIAN to the firefighter, as well as the IC and EMS module on-scene. Other passive sensors, such as hazardous gas detectors, are also operating in the firefighter's PAN and this data is distributed over the TIAN. With the IC's guidance, the firefighters search each apartment for survivors and the source of the fire. The IC is able to monitor the location of each firefighter and is aware of which apartments have been searched by the information provided on the GIS displays.

5. The EMS module outside the apartment uses the TIAN to monitor the vital signs of all the firefighters in and around the fire scene. The module alerts the IC that firefighter F725 is showing signs of distress and the IC orders F725 and his partner F734 out of the building for a check-up with the EMS team.

6. Firefighter F765 pushes his emergency button when he becomes disoriented in the smoke. The emergency call is sent as a priority message over the TIAN to the IC where an alarm is generated and a communication path is established between the IC and firefighter F765. The IC immediately directs firefighter F788 to his aid by providing F765's location relative to F788.

7. While the firefighters check every apartment for victims, the main fire is discovered in a second floor apartment kitchen where an electric range is burning. Two adults and two children are discovered in the apartment suffering from smoke inhalation. RF IDs are attached to their arms and each is given an oxygen tank and mask to help their breathing. They are carried outside the building where the EMS module is ready to take over medical aid.

8. While the firefighters put out the fire in apartment 202, the IC checks the GIS display, which shows where the fire personnel are and where all the survivors and rescued individuals live in the apartment building. Two top-floor apartments have not been searched and the IC moves fire personnel to those apartments. The apartment database indicates an invalid may be living in apartment 321. The firefighters break down the doors of both apartments and in 321 find a bedridden individual, who is in good condition, and a pet dog in the other apartment. Both are outfitted with RF ID devices and taken from the building.

9. The fire is brought under control. The IC releases E12 and the IC disconnects E12's TIAN modules from the IAN. E7 and L7 wrap their fire operations and A34 has to transport one fire victim to the hospital. The IC releases all remaining equipment, disconnects their TIAN modules, and gives control to dispatch.

Fire Communications Summary

Throughout the scenario, the fire personnel and equipment, EMS support personnel, and the fire victims interoperate over the TIAN. They are tracked by the TIAN providing geo-location information in real time, providing the Incident Commander with current accountability of public safety personnel and of the fire's victims. All victim information and vitals are recorded through TIAN wireless monitors and voice recognition systems with no reliance on paper reports and notes. All fire personnel and equipment have monitors to measure vital conditions and status that are reported by the wireless PAN and TIAN systems to the IC's GIS. The GIS also has access to city building department databases, which are searched and queried for building information and plans, fire hydrant locations, etc.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for establishing communications interoperability at an incident between differing entities having dissimilar communications devices operating on differing isolated networks, comprising the steps of:
   providing each of the entities with a temporary incident area network module having the ability to wirelessly communicate with other modules, each module communicating with at least one communications device and converting traffic between the associated communications device and the module to a universal protocol and a common frequency; and,
   causing one of the modules arriving at the incident to set up an ad hoc temporary incident area network, each module having a range for establishing communication, the one of the modules detecting the presence of other modules arriving at the incident when they come into range and establishing communications with the newly-arriving modules, whereby interoperability is established between all of the communications devices at the incident regardless of communication device protocol or frequency compatibility.

2. The method of claim 1, wherein the one module sets up a routing topology.

3. The method of claim 2, wherein the step of setting up a routing topology includes the step of assigning different IP addresses to different arriving modules, whereby each arriving module is individually addressable.

4. The method of claim 1, wherein the one module is under control of an incident commander.

5. The method of claim 2, wherein the one module is under the control of an incident commander and wherein the incident commander establishes the routing topology.

6. The method of claim 1, wherein each of the communications devices is switchable between communicating with its associated module and its isolated network, whereby an entity can either communicate with all entities at the incident, or with only entities logged onto the associated isolated network.

7. The method of claim 1, wherein each module converts any analog communications from the associated communications device to a digital format.

8. The method of claim 7, wherein any analog voice communication from a communications device is converted using a voice over Internet protocol converter.

9. The method of claim 1, wherein the module is an add-on to an existing radio that communicates with an associated communications device over an isolated network.

10. The method of claim 1, wherein the module is a standalone unit having a transceiver for communicating with an associated communications device.

11. The method of claim 10, wherein the module is powered by a self-contained battery and further including the step of locating the standalone module at a convenient location at the incident, the module having a range exceeding that of an associated communications device, whereby the range of the associated communications device is extended when the associated communications device is communicating with the standalone module.

12. A system for aiding first responders to an incident to intercommunicate regardless of the type of communications devices used by the first responders, comprising:
    communications devices;
    a network module for one or more of said communications devices, said module converting the frequencies and protocols of the communications devices coupled thereto to a universal frequency and protocol and establishing wireless communication between said universal modules using said universal frequency and protocol, said module setting up an ad hoc temporary incident area network at said incident, such that when additional modules arrive at the incident, said ad hoc temporary incident area network permits interoperability between communications devices used by the first responders arriving at the incident.

13. The system of claim 12, wherein the protocol used by said modules is one in which all analog communications are converted to digital data.

14. The system of claim 13, wherein analog voice communications from a communications device are converted by a VoIP converter to digital data.

15. The system of claim 12, wherein each of said modules includes means for detecting the arrival of additional modules in range and for assigning a digital address to a detected module.

16. The system of claim 15, wherein said address is an IP address.

17. The system of claim 12, wherein different communications devices are set to communicate over different frequencies and wherein said modules communicate on one frequency.

18. The system of claim 12, wherein different communications devices communicate using different protocols and wherein said modules communicate using a common protocol.

19. The system of claim 12, wherein said communications devices include a switch for switching from communicating over an isolated network to communicating with an associated module.

* * * * *